United States Patent
Frye et al.

(10) Patent No.: US 7,405,259 B2
(45) Date of Patent: Jul. 29, 2008

(54) SILYLATED POLYMER DERIVED FROM BUTADIENE AND SOLVENT-RESISTANT PRESSURE SENSITIVE ADHESIVE COMPOSITION CONTAINING SAME

(75) Inventors: Robert L. Frye, Concord, OH (US); Richard P. Eckberg, Gansevoort, NY (US); Roy M. Griswold, Ballston Spa, NY (US)

(73) Assignee: Momentive Performance Materials Inc., Wilton, CT (US)

( * ) Notice: Subject to any disclaimer, the term of this patent is extended or adjusted under 35 U.S.C. 154(b) by 285 days.

(21) Appl. No.: 11/297,757

(22) Filed: Dec. 8, 2005

(65) Prior Publication Data

US 2006/0247370 A1    Nov. 2, 2006

Related U.S. Application Data

(63) Continuation-in-part of application No. 11/119,263, filed on Apr. 29, 2005, now abandoned.

(51) Int. Cl.
*C08G 18/28* (2006.01)
(52) U.S. Cl. .................. 525/477; 528/29; 528/44; 528/69; 528/70; 528/75; 528/85; 528/30; 528/38; 528/25

(58) Field of Classification Search .............. None
See application file for complete search history.

(56) References Cited

U.S. PATENT DOCUMENTS

| | | | |
|---|---|---|---|
| 4,837,274 A | 6/1989 | Kawakubo et al. |
| 4,900,772 A | 2/1990 | Imanaka et al. |
| 4,904,732 A | 2/1990 | Iwahara et al. |
| 5,223,575 A | 6/1993 | Mori et al. |
| 5,767,197 A | 6/1998 | Fukatsu et al. |
| 6,121,354 A | 9/2000 | Chronister |
| 6,803,412 B2 | 10/2004 | Nguyen-Misra et al. |

FOREIGN PATENT DOCUMENTS

| | | |
|---|---|---|
| JP | 56-082863 | 7/1981 |
| JP | 57-207663 | 12/1982 |
| JP | 59-172575 | 9/1984 |
| JP | 59-174672 | 12/1984 |
| JP | 61-218631 | 9/1986 |
| JP | 61-218672 | 9/1986 |
| JP | 61-218673 | 9/1986 |
| JP | 62-057478 | 3/1987 |
| JP | 62-057479 | 3/1987 |
| JP | 62-057480 | 3/1987 |
| JP | 62-089782 | 4/1987 |
| JP | 03-259981 | 11/1991 |
| JP | 09-165565 | 6/1997 |

*Primary Examiner*—Marc S Zimmer
(74) *Attorney, Agent, or Firm*—Dominick G. Vicari

(57) ABSTRACT

A silylated polymer contains repeating units derived from butadiene. The polymer when partially silylated is especially useful for pressure sensitive adhesives where it imparts superior solvent resistance performance thereto.

24 Claims, No Drawings

SILYLATED POLYMER DERIVED FROM BUTADIENE AND SOLVENT-RESISTANT PRESSURE SENSITIVE ADHESIVE COMPOSITION CONTAINING SAME

CROSS REFERENCE TO RELATED APPLICATIONS

The present application is a continuation in part of U.S. application Ser. No. 11/119,263 filed Apr. 29, 2005, now abandoned to which priority is claimed and which is herein incorporated by reference.

BACKGROUND OF THE INVENTION

This invention relates to silylated polymers and to pressure sensitive adhesive (PSA) compositions containing same.

There are certain adhesive applications for which solvent resistance is highly desirable. These include automotive, aerospace, industrial and consumer labels where exposure to aromatic, aliphatic solvents and oils occurs. Solvent-resistant adhesives are also required for labels used by analytical laboratories such as environmental and medical laboratories to prevent loss of critical sample identification information. Further applications include electronic labels or masked areas undergoing further processes; dry cleaning labels for garments; degreasing operations where identification labels or masked-off areas are required, and the like. Adhesive properties of many pressure sensitive or heat-activated adhesives are well suited for use with labels on various substrates. However, these are not significantly solvent-resistant and therefore it is highly desirable that a solvent-resistant adhesive be provided.

Solvent-resistant adhesive compositions are known in the art.

JP 56082863 describes a thermoplastic polystyrene-polybutadiene block copolymer or a mixture thereof with another thermoplastic rubber of ethylene-vinyl acetate copolymer combined with an acryl-modified polybutadiene.

JP 57207663 describes a compound comprised of ethylenic ionomer resin, a polyurethane resin, a polyethylene resin, a polyamide resin, a polyester resin, an agent for the thermal curing of a synthetic resin, and a thickener.

JP 59172575 describes a solvent-resistant hot melt adhesive comprised of a polyester amide containing terminal alkoxyl groups prepared by reacting an aminoalkylalkoxysilane compound with a polyester-amide containing terminal isocyanate groups.

JP 59174672 describes a solvent-resistant acrylic adhesive comprised of the reaction product a vinyl compound (e.g., methyl acrylate, isobutyl methacrylate, etc.) and a vinyl dioxazolone compound.

JP 61047774 describes a solvent-resistant adhesive comprised of amino group terminated polyamide resin reacted with a isocyanate group-containing alkoxysilane that is the addition product of, for example, hexamethylene diisocyanate and 3-aminopropyltriethoxy-silane.

JP 61218631 describes a solvent-resistant adhesive comprised of a silane-modified polyester resin obtained by reacting a polyester resin containing a hydroxyl group with an isocyanate group-containing hydrolyzable organosilicon compound.

JP 61218672 describes a solvent-resistant acrylic adhesive comprised of an unsaturated polyester resin having terminal ethylenic groups which is the reaction product of a ethylenic compound having isocyanate groups with terminal hydroxyl groups or carboxyl groups of an unsaturated polyester resin.

JP 61218673 describes a solvent-resistant acrylic adhesive comprised of an unsaturated polyester resin having terminal ethylenic double bonds obtained by reacting epoxy(meth)acrylate with the terminal carboxyl groups of an unsaturated polyester resin having ethylenic double bond in the molecule.

JP 62057480 describes a solvent-resistant adhesive comprised of a polyamide resin having terminal ethylenic double bonds obtained by reacting a compound having aziridinyl and ethylenic groups with terminal carboxyl groups of a polyamide resin.

JP 62057479 describes a solvent-resistant adhesive comprised of an unsaturated polyester resin having both terminal and in-chain ethylenic double bonds obtained by reacting a compound having aziridinyl and ethylenic groups with terminal carboxyl groups of an unsaturated polyester resin.

JP 62057478 describes a solvent-resistant adhesive comprised of an unsaturated polyester resin having terminal and in-chain ethylenic double bonds obtained by reacting a terminal hydroxyl group of an unsaturated polyester resin with an epoxy (meth)acrylate.

JP 62089782 describes a solvent-resistant adhesive obtained by reaction between a high-molecular weight diol, preferably a polyester diol of polyethylene-butylene-adipate, a divalent isocyanate compound, a chain extender and a hindered nitrogen atom compound such as one containing a piperizine ring.

JP 03259981 describes a solvent-resistant adhesive comprised of a composition prepared by compounding a block copolymer and an isocyanate pre-polymer. The block copolymer comprises a block consisting of at least two kinds of aromatic vinyl monomer and a block consisting of at least one kind of a conjugated diene monomer in which at least 50% of carbon-carbon double bonds in the block have been hydrogenated (e.g. a hydrogenated styrene-isoprene-styrene triblock copolymer). The isocyanate prepolymer is obtained by reacting an isocyanate compound with a liquid polymer which comprises a polymer of isoprene or isoprene-butadiene mixture and has 1.5-5.0 hydroxyl groups in the molecule and in which at least 50% of the carbon-carbon double bonds have been hydrogenated.

JP 09165565 describes a solvent-resistant adhesive composition which is a blend of a base polymer with a tackifier resin and, optionally, a softening agent or a wax, a block copolymer which comprises one or more hydrogenated butadiene polymer blocks, one or more of aromatic vinyl compound polymer blocks and one or more polymer blocks substantially having an olefin polymer structure.

SUMMARY OF THE INVENTION

In accordance with the present invention, there is provided a silylated polymer containing repeating units derived from butadiene.

Further in accordance with the invention herein, there is provided a moisture-curable pressure sensitive adhesive composition of improved solvent resistance comprising partially silylated polymer containing repeating units derived from butadiene and, optionally, one or more known or conventional adhesive composition additives.

DETAILED DESCRIPTION OF THE INVENTION

The silylated polymer of this invention is derived from hydroxyl-terminated polybutadiene, understood herein to include any hydroxyl-terminated polymer in which at least about 50 weight percent of the polymer is made up of units derived from butadiene.

The silylated polymer is obtained (1) by the silylation (i.e., end capping) of polybutadiene-based polyurethane prepolymer possessing isocyanate termination with a silane possessing at least one hydrolyzable group and functionality which is reactive for isocyanate, e.g., a secondary aminoalkyltrialkoxysilane, or (2) by the silylation of a polybutadiene-based polyurethane prepolymer possessing hydroxyl termination with an isocyanatosilane possessing at least one hydrolyzable group.

A. The Hydroxy-terminated Polybutadienes

The polybutadiene-based polyurethane prepolymer is obtained by reacting one or more hydroxyl-terminated, optionally hydrogenated, linear or branched polybutadiene homopolymers or copolymers with an organic polyisocyanate, e.g., an organic diisocyanate, optionally together with one or more other difunctional compounds and/or hydroxyl-terminated polymers, to provide (1) an isocyanate-terminated polyurethane prepolymer when the total equivalents of isocyanate functionality exceeds the total equivalents of hydroxyl functionality, and (2) a hydroxyl-terminated polyurethane prepolymer when the total equivalents of hydroxyl functionality exceeds the total equivalents of isocyanate functionality.

Among the hydroxyl-terminated polybutadienes that are useful for preparing the isocyanate-terminated and hydroxyl-terminated polyurethane prepolymers are those possessing a number average molecular weight (Mn) of from about 500 to about 10,000, and advantageously from about 800 to about 5,000, a primary hydroxyl group content of from about 0.1 to about 2.0 meq/g, and advantageously from about 0.3 to about 1.8 meq/g, a degree of hydrogenation of from 0 up to 100 percent of the olefinic sites present and an average content of copolymerized additional monomer(s) of from 0 up to about 50 weight percent.

Hydroxyl-terminated butadienes of the above-described type, averaging more than one predominantly primary hydroxyl group per molecule, e.g., averaging from about 1.7 to about 3 or more primary hydroxyl groups per molecule, are suitably employed herein. The hydroxyl-terminated polybutadienes will possess an average of at least about 2, and advantageously from about 2.4 up to about 2.8, hydroxyl groups per molecule, the hydroxyl groups being predominantly in terminal allylic positions on the main, i.e., generally longest, hydrocarbon chain of the molecule. By "allylic" configuration is meant that the alpha-allylic grouping of allylic alcohol, i.e., the terminal hydroxyl groups of the polymer, are bonded to carbon atoms adjacent to double bonded carbon atoms.

The ratio of cis-1,4, trans-1,4 and 1,2-vinyl unsaturation which occurs in the butadiene polymers employed in this invention, the number and location of the hydroxyl groups and the molecular weight of the butadiene polymers will be influenced by the process employed for their manufacture, the details of which are known in the art.

Hydroxyl-terminated polybutadienes possessing these characteristics are commercially available from several sources and are therefore conveniently employed herein.

The useful hydroxyl-terminated polybutadienes herein can also incorporate one or more other copolymerizable monomers which can confer particularly desirable properties upon the silylated polymers herein and the pressure sensitive adhesive compositions prepared therewith. The total amount of copolymerized monomer will not exceed, on average, 50 weight percent of the hydroxyl-terminated polybutadiene copolymer. Included among the copolymerizable monomers are monoolefins and dienes such as ethylene, propylene, 1-butene, isoprene, chloroprene, 2,3-methyl-1,3-butadiene, 1,4-pentadiene, etc., and, ethylenically unsaturated monomers such as acrylonitrile, methacrylonitrile, methylstyrene, methyl acrylate, methyl methacrylate, vinyl acetate, etc. Alternatively or in addition thereto, the hydroxyl-terminated polybutadienes can be reacted with one or more other monomers to provide hydroxyl-terminated block copolymers. Such monomers include 1,2-epoxides such as ethylene oxide and propylene oxide which will provide polyether segments, e-caprolactone which will provide polyester segments, and the like.

B. The Polyurethane Prepolymer

1. Isocyanate-terminated Polyurethane Prepolymer

Isocyanate-terminated polyurethane prepolymers, useful in the present invention, are prepared by reacting an excess of organic polyisocyanate with one or more of the foregoing hydroxyl-terminated polybutadiene homopolymers and or copolymers, generally, in the presence of a catalyst. As used herein, the term "polyisocyanate" means an organic compound possessing two or more isocyanate groups. The reaction temperature is typically in the range of from about 60° to about 90° C.; the reaction time is typically from about 4 to about 8 hours.

In addition to the hydroxyl-terminated butadiene-based polymer, the reaction mixture can contain one or more chain extenders and/or one or more other polyols. Examples of suitable chain extenders are polyhydric alcohols such as ethylene glycol, propylene glycol, propane-1,3-diol, butane-1,4-diol, hexane-1,6-diol, diethylene glycol, triethylene glycol, tetraethylene glycol, dipropylene glycol, triethylene glycol, tetrathylene glycol, dipropylene glycol, tripropylene glycol, tetrapropylene glycol and the like. Additional polyols include polyether polyols, polyester polyols, polyetherester polyols, polyesterether polyols, polybutadienediols, polyoxyalkylene diols, polyoxyalkylene triols, polytetramethylene glycols, polycaprolactone diols and triols, and the like, all of which possess at least two primary hydroxyl groups.

Suitable organic polyisocyanates include any of the known and conventional organic polyisocyanates, especially organic diisocyanates, from which polyurethane polymers have heretofore been prepared. Useful diisocyanates include, for example, 2,4-toluene diisocyanate, 2,6-toluene diisocyanate, 4,4' diphenylmethanediisocyanate, isophorone diisocyanate, dicyclohexylmethane-4,4'-diisocyanate, various liquid diphenylmethane-diisocyantes containing a mixture of 2,4- and 4,4' isomers, Desmodur N® (Bayer) and the like, and mixtures thereof. Isophorone diisocyanate is especially advantageous for use in preparing the polyurethane prepolymers herein.

Suitable catalysts useful in the preparation of the polyurethane prepolymers are dialkyltin dicarboxylates such as dibutyltin dilaurate and dibutyltin acetate, tertiary amines, the stannous salts of carboxylic acids such as stannous octoate and stannous acetate, and the like.

To prepare isocyanate-terminated polyurethane prepolymers, at least a slight mole excess of the isocyanate equivalents (NCO groups) with respect to the hydroxyl equivalents (OH groups) is employed to terminate the polybutadiene homopolymer(s) and/or copolymer(s) with isocyanate groups. Advantageously, the molar ratio of NCO to OH is from about 1.1 to about 4.0 depending on the selection of the particular hydroxyl-terminated polybutadiene homopolymer(s) and/or copolymer(s), optional chain extenders and optional non-butadiene based polyols.

2. Hydroxyl-terminated Polyurethane Prepolymer

Hydroxyl-terminated polyurethane prepolymers, useful in the present invention, can be prepared by the reaction of an organic polyisocyanate, e.g., a diisocyanate such as any of those mentioned above, and advantageously isophorone diisocyanate, with a stoichiometric excess of the selected hydroxyl-terminated polybutadiene homopolymer(s) and/or copolymer(s). Depending on the reactivity of the respective reactants, a catalyst such as any of those mentioned above can be employed. The reaction temperature is typically in the range of from about 60° to about 90° C.; the reaction time is typically on the order of from about 2 to about 8 hours. The reaction mixture can also contain one or more chain extenders and/or other polyols such as any of those mentioned above.

To prepare the hydroxyl group-terminated polyurethane prepolymers, at least a slight molar excess of the hydroxyl equivalents (OH groups) with respect to the NCO isocyanate equivalents (NCO groups) is employed to terminate the polybutadiene chains with hydroxyl groups. Advantageously, the molar ratio of NCO to OH is from about 0.3 to about 0.95, and more preferably from about 0.5 to about 0.90, depending on the specific hydroxyl-terminated polybutadiene employed.

C. The Silylated Polyurethane Prepolymer

1. Silylated Isocyanate-terminated Polyurethane Prepolymer

Silylation of the isocyanate-terminated polyurethane prepolymer can be accomplished by reacting the prepolymer with a silane possessing at least one hydrolyzable group and at least one functionality which is reactive for isocyanate, i.e., an active hydrogen-containing group such as hydroxyl, carboxylic acid, mercapto, primary amino or secondary amino. Advantageously, the silane is a primary or secondary aminosilane of the general formula:

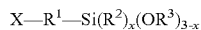

$$X\text{—}R^1\text{—}Si(R^2)_x(OR^3)_{3-x}$$

wherein X is an active hydrogen-containing group that is reactive for isocyanate, e.g., —SH or —NHR$^4$ in which R$^4$ is H, a monovalent hydrocarbon group of up to 8 carbon atoms or —R$^5$—Si(R$^6$)$_y$(OR$^7$)$_{3-y}$, R$^1$ and R$^5$ each is the same or different divalent hydrocarbon group of up to 12 carbon atoms, optionally containing one or more heteroatoms, each R$^2$ and R$^6$ is the same or different monovalent hydrocarbon group of up to 8 carbon atoms, each R$^3$ and R$^7$ is the same or different alkyl group of up to 6 carbon atoms and x and y each, independently, is 0, 1 or 2.

Non-limiting examples of aminosilanes for use in the silylation procedure herein include the mercaptosilanes 2-mercaptoethyl trimethoxysilane, 3-mercaptopropyl trimethoxysilane, 2-mercaptopropyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane, 3-mercaptopropyl trioctoxysilane, 2-mercaptoethyl tri-2'-ethylhexoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxy phenylsilane, 3-mercaptocyclohexyl-trimethoxysilane, 12-mercaptododecyl trimethoxy silane, 12-mercaptododecyl triethoxy silane, 18-mercaptooctadecyl trimethoxysilane, 18-mercaptooctadecyl methoxydimethylsilane, 2-mercapto-2-methylethyltripropoxysilane, 2-mercapto-2-methylethyl-trioctoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyl trimethoxysilane, 1-mercaptomethyltolyl triethoxysilane, 2-mercaptoethylphenyl trimethoxysilane, 2-mercaptoethylphenyl triethoxysilane, 2-mercaptoethyltolyl trimethoxysilane, 2-mercaptoethyltolyl triethoxysilane, 3-mercaptopropylphenyl trimethoxysilane and, 3-mercaptopropylphenyl triethoxysilane, and the aminosilanes 3-aminopropyltrimethoxysilane, 3-aminopropyltriethoxysilane, 4-aminobutyltriethoxy-silane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropyl-methyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethylbutyldimethoxymethylsilane, N-ethyl-4-amino-3,3-dimethylbutyltrimethoxy-silane, N-(cyclohexyl)-3-aminopropyltrimethoxysilane, N-(2-aminoethyl)-3-aminopropyltrimethoxysilane, N-(2-aminoethyl)-3-aminopropyltriethoxy-silane, N-(2-aminoethyl)-3-aminopropylmethyldimethoxysilane, aminopropyltriethoxysilane, bis-(3-trimethoxysilyl-2-methylpropyl)amine and N-(3'-trimethoxysilylpropyl)-3-amino-2-methylpropyltrimethoxysilane.

For applications such as use in sealant and coating compositions, the polyurethane prepolymers can be substantially fully silylated, i.e., all, or substantially all, of the isocyanate groups can be reacted with silane to provide a completely silylated polyurethane polymer.

However, where the silylated polyurethane polymer is to be incorporated into pressure sensitive adhesive compositions, it is important that the silylation be conducted to less than completion in order that the extent of crosslinking that occurs on subsequent cure of the silylated polymer not be so great as to adversely affect, and even eliminate, the pressure sensitive adhesive characteristics of the crosslinked polymer.

In conducting a partial silylation reaction, it can be useful to include a primary monoamine such as N-ethylbutylamine or similar capping reactant together with the silane as the amine will readily end-cap isocyanate groups thereby precluding them from reacting with the silane. The optimal amounts of silane and optional amine for achieving this less-than-complete silylation operation can be readily determined for a given isocyanate-terminated prepolymer employing known and conventional experimental techniques. Silylation of not more than about 95 percent, and advantageously not more than about 90 percent, of the total isocyanate groups present in the prepolymer is generally suitable for most pressure sensitive adhesive applications.

2. Silylated Hydroxyl-terminated Polyurethane Prepolymer

Silylation of the hydroxyl-terminated polyurethane prepolymer can be accomplished by reacting the prepolymer with an isocyanatosilane. Suitable isocyanatosilanes are those of the general formula:

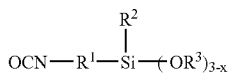

wherein $R^1$ is a divalent alkylene group of from 3 to 10 carbon atoms, $R^2$ and $R^3$ each independently is an alkyl group of from 1 to 6 carbon atoms or an aryl group of from 6 to 8 carbon atoms, and x has a value of 0, 1 or 2.

Examples of such isocyanatosilanes for use in the silylation procedure are λ-isocyanatopropyltrimethoxysilane, λ-isocyanatopropyltriethoxy-silane, λ-isocyanatomethylpropyltrimethoxy-silane, λ-isocyanatomethylpropyltriethoxysilane, λ-isocyanatopropylmethyldimethoxysilane, λ-isocyanatopropyldimethylmethoxysilane and λ-isocyanatomethylpropyldimethylmethoxysilane.

As in the case of the silylated isocyanate-terminated polyurethanes described above, the silylation of the hydroxyl-terminated polyurethane prepolymers herein will be substantially complete, i.e., essentially no hydroxyl groups will be present following silylation, where the silylated polymers are to be incorporated in such products as sealants and coatings. However, silylation will be incomplete, or partial, where the silylated polymers are to be incorporated in pressure sensitive adhesive compositions. In the case of incomplete silylation, levels of silylation of not more than about 95 percent, and advantageously, not more than about 90 percent, of the total hydroxyl groups present in the prepolymer is generally suitable and can be achieved by appropriate adjustment of the amounts of isocyanatosilane being reacted for a given prepolymer.

In order to facilitate control over the extent of incomplete silylation, it may be advantageous to include a hydroxyl-reactive monofunctional reactant with the isocyanatosilane. Suitable reactants for this purpose include monoisocyanates such as n-butylisocyanate. These and similar reactants serve to cap some of the hydroxyl groups of the prepolymer preventing them from undergoing silylation. Amounts of such hydroxyl-reactive monomeric reactants and isocyanatosilanes that can be utilized for partial silylation herein can be readily determined for a specific hydroxyl-terminated polyuretehane prepolymer employing routine experimental testing.

D. Pressure Sensitive Adhesive Compositions

Pressure sensitive adhesive compositions of superior solvent-resistance can be obtained with the partially silylated polyurethanes described above. In addition to the partially silylated polyurethanes, a solvent-resistant pressure sensitive adhesive composition in accordance with the invention will typically include one or more additives such as fillers, tackifiers, silane adhesion promoters, plasticizers, solvents, thixotropic agents, U.V. stabilizers, antioxidants, cure catalysts, etc., in the usual amounts.

Typical fillers suitable for addition to the pressure-sensitive adhesive compositions of this invention include fumed silica, precipitated silica and calcium carbonates. Treated calcium carbonates having particle sizes from about 0.07μ to about 4μ are particularly useful and are available under several trade names: Ultra Pflex, Super Pflex, Hi Pflex from Specialty in Minerals; Winnofil SPM, SPT from Zeneca Resins; Hubercarb lat, Hubercarb 3Qt and Hubercarb W from Huber and Kotomite from ECC. These fillers can be used either alone or in combination. The fillers can comprise up to about 200 parts per 100 parts of the silylated polymer component(s) with from about 80 to about 150 parts filler per 100 parts polymer being suitable for many adhesive applications.

The pressure sensitive adhesive composition can contain from about 20 to about 60 parts, and advantageously from about 30 to about 50 parts, of one or more known of conventional tackifiers per 100 parts of silylated polyurethane polymer. Examples of suitable tackifiers are MQ silicone resins (for which a curing catalyst such as benzoyl peroxide will ordinarily be included), terpene oligomers, coumarone/indene resins, aliphatic, petrochemical resins, and modified phenolic resins.

Silane adhesion promoters can be employed at levels of from about 0.5 to about 5 parts per hundred parts of the silylated polyurethane polymer with from about 0.8 to about 1.5 parts per hundred parts polymer being especially advantageous. Suitable adhesion promoters include Silquest A-1120 silane, Silquest A-2120 silane, Silquest A-1170 silane and Silquest A-187 silane, all of which are available from GE Silicones.

Exemplary plasticizers include phthalates, dipropylene and diethylene glycol dibenzoates and mixtures thereof, epoxidized soybean oil, and the like. Dioctyl and diisodecylphthalate are commercially available under the trade names Jayflex DOP and JayFlex DIDP from Exxon Chemical. The dibenzoates are available as Benzoflex 9-88, Benzoflex 50 and Benzoflex 400 from Velsicol Chemical Corporation. Epoxidized soybean oil is available from Houghton Chemical Corporation as Flexol EPO. The plasticizer can comprise up to about 100 parts of the silylated polyurethane polymer with from about 40 to about 80 parts per hundred parts of silylated polymer being satisfactory in many cases.

Useful solvents include aromatic, aliphatic and esters ranging in amounts of from about 25 to about 75 per hundred parts by weight of silylated polyurethane prepolymer.

Illustrative of useful thixotropic agents are various castor waxes, fumed silica, treated clays and polyamides. These additives typically comprise about 1 to about 10 parts per hundred parts of silylated polyurethane prepolymer with from about 1 to about 6 parts being useful for most applications. The thixotropes include those available as: Aerosil from Degussa, Cabo-Sil TS 720 from Cabot, Castorwax from CasChem, Thixatrol and Thixcin from Rheox and Dislon from King Industries. If the thixotrope is reactive with silane (e.g., silica), adjustments to the amount formulated may be needed to compensate therefor.

U.V. stabilizers and/or antioxidants can be incorporated into the pressure sensitive adhesive compositions of this invention in an amount of from 0 to about 5 parts per hundred parts silylated polyurethane polymer with from about 0.5 to about 2 parts providing generally good results. These materials are available from Ciba-Geigy under the trade names Tinuvin 770, Tinuvin 327, Tinuvin 213, Tinuvin 622 and Irganox 1010.

Suitable cure catalysts are the same as those previously described for preparation of the silylated polyurethane polymers. The catalysts typically compromise from about 0.01 to about 3 parts per hundred parts polymer with from about 0.01 to about 1.0 parts per hundred parts of polymer being entirely suitable in many cases.

After mixing, the pressure sensitive adhesive compositions are cured by exposure to moisture. Curing conditions typically include ambient temperature, e.g., about 23° C. and 50% relative humidity for 3 days and 37° C. and 95% relative humidity for another 4 days. Alternatively water can be dissolved in an appropriate solvent such as isopropanol followed by mixing with the adhesive composition and coated, cured in convensional adhesive cure ovens known in the art.

The following examples are illustrative of the silylated polymers of this invention and solvent-resistant pressure sensitive adhesive compositions containing same.

EXAMPLE 1

To a reaction vessel equipped with mixing capability, condenser, nitrogen atmosphere and heating was added 250.0 g of hydroxyl-terminated polybutadiene Poly bd® R-20LM resin (SpecialChem) possessing a hydroxyl number of 101. This resin was dried using a nitrogen purge at 85° C. over night. The resin was cooled to 65° C. followed by addition of 0.21 g of a 10 wt % solution of dibutyltin dilaurate and agitation for 30 minutes. Next, 75.2 g of isophorone diisocyanate (IPDI) was added drop wise over a two-minute period with agitation. An exotherm to 88° C. was observed and the temperature was reduced to, and held at, 72-75° C. for 45 minutes. The wt % NCO was determined by standard methodology and found to be 2.74 wt %. At this point, 49.7 g of N-ethylamino isobutyltrimethoxysilane was added and agitation continued at temperature for 1 hour followed by cooling to room temperature. An approximately 15 g sample of the reaction product was dissolved in 35 g of toluene containing 0.37 g benzoyl peroxide. This mixture was bar-coated onto a 2 mil polyester film to yield a 1 mil dry adhesive thickness, then cured for 5 minutes at 150° C. Lap shear samples were prepared with 0.25 inch×1.0 inch overlap onto a smooth surface Delrin® (DuPont's polyoxymethylene) plaque with a 100 g weight. The lap shear samples were suspended in xylene that was slowly stirred using a magnetic stirrer and bar. Testing was conducted in duplicate and times to adhesive failure were 200 and 165 minutes.

EXAMPLE 2

To a reaction vessel equipped with mixing capability, condenser, nitrogen atmosphere and heating was added 120.0 g of hydroxyl-terminated polybutadiene Poly bd® R-45M (SpecialChem) resin possessing a hydroxyl number of 40.4 and 120.0 g of a polypropylene polyol Acclaim® 4200 (SpecialChem) possessing a hydroxyl number of 28. The polyols were dried to reduce their moisture level. To this mixture was added 24.5 g of isophorone diisocyanate followed by heating for 2 hours at approximately 80° C. which was then decreased to 70-75° C. for 3 hours at which point 0.2 g of a 10 wt % solution of dibutyltin dilaurate was added and the temperature maintained for 1 hour. The wt % NCO was determined to be 0.8 wt %. At this point, 24.5 g of N-ethylaminoisobutyltrimethoxysilane was added and agitation continued while cooling to room temperature. A sample was coated and cured as in Example 1 except curing was conducted for 2 minutes at 177° C. Testing was carried out as in Example 1. Time to adhesive failure was found to be greater than 200 minutes.

EXAMPLE 3

To a reaction vessel equipped with mixing capability, condenser, nitrogen atmosphere and heating was added 200.0 g hydroxyl-terminated polybutadiene Krasol® LBHP2000 (Sartomer) resin possessing a hydroxyl number of 46 and 200.0 g toluene which was then refluxed to reduce moisture level. To this was added 35.9 g of isophorone diisocyanate after cooling to 85° C. Temperature was maintained at 85-95° C. for 3 hours at which point 0.1 g of a 10 wt % solution of dibutyltin dilaurate was added and continued at temperature for 1 hour. The wt % NCO was determined to be 2.4 wt %. At this point, 32.4 g of N-ethylaminoisobutyltrimethoxysilane was added and agitation continued while cooling to room temperature. A sample was coated and cured as in Example 1 except curing was conducted for 3 minutes at 150° C. Testing was carried out as in Example 1. The wt % benzoyl peroxide based on solids was 1.5 wt %. Time to adhesive failure on a smooth surface Delrin® plaque was 200 and 316 minutes and on glass slides greater then 24 hours at which point testing was terminated. Time to adhesive failure for the sample dried as above without peroxide catalyst was 30 minutes on Delran and 35 minutes on glass.

This reaction product was blended 1:1 on a weight basis with Norsolene A-110 (SpecialChem) resin then cured using 1 wt % benzoyl peroxide for 5 minutes at 130° C. Time to failure was 210 minutes for the Delrin® substrate.

To 15 g of the above sample was added a hydrogen polysiloxane containing 0.72 wt % hydrogen, 0.05 g of a 1 wt % platinum catalyst and 10 g toluene. This mixture was coated and cured at 135° C. for 10 minutes. Time to adhesive failure on a smooth surface Delran plaque was found to be 83 and 85 minutes and on glass slides was 50 and 50 minutes.

EXAMPLE 4

To a reaction vessel equipped with mixing capability, condenser, nitrogen atmosphere and heating was added 100.0 g hydroxyl-terminated polybutadiene Krasol® HLBHP3000 (Sartomer) resin possessing a hydroxyl number of 31 and 85.0 g polycaprolactone polyol Capa® 2302A possessing a hydroxyl number of 38 followed by heating at 100-110° C. to reduce moisture level. To this mixture was added 8.4 g of isophorone diisocyanate after cooling to 80° C. The temperature was maintained at 80-95° C. for 3 hours at which point 0.4 g of a 10 wt % solution of 2,2'-dimorpholinediethyl-ether was added and continued at temperature for 3 hours. The temperature was reduced to 65° C. and 8.0 g 3-isocyanatopropyltrimethoxysilane was added and further heated at 70-80° C. for 4 hours. A sample was coated and cured as in Example 1 and time to adhesive failure on a smooth surface Delrin® plaque was found to be 70 and 75 minutes and on glass slides 40 and 60 minutes.

EXAMPLE 5

To a reaction vessel equipped with mixing capability, condenser, nitrogen atmosphere and heating was added 100.0 g a,a,a-trifluorotoluene, 100.0 g hydroxyl-terminated polybutadiene Poly bd® LF3 resin possessing a hydroxyl number of 49.4 and 37.0 g $HOCH_2CH_2(CF_2)_{-10}CF_3$ Zonyl® BA-LD (DuPont) possessing a hydroxyl number of 92 which was then heated to reduce moisture level. To this mixture was added 27.7 g of isophorone diisocyanate followed by the addition of 0.1 g of a 10 wt % solution of dibutyltin dilaurate with the temperature being maintained at 65-75° C. for 3 hours. The wt % NCO was determined to be 1.3 wt %. At this point, 17.6 g of N-ethylaminoisobutyltrimethoxysilane was added and agitation continued while cooling to room temperature. A sample was coated and cured as in Example 1 and time to adhesive failure on a smooth surface Delrin® plaque was found to be 30 minutes and on glass slides 145 minutes.

EXAMPLE 6

To a reaction vessel equipped with mixing capability, condenser, nitrogen atmosphere and heating was added 100.0 g a,a,a-trifluorotoluene, 100.0 g hydroxyl-terminated polybutadiene Poly bd® R45HTLO (SpecialChem) resin possessing a hydroxyl number of 45.4 and 18.4 g $HOCH_2$ CH$_2$(CF$_2$)$_{\sim10}$ CF$_3$ Zonyl® BA-LD (DuPont) possessing a hydroxyl number of 92 followed by heating to reduce moisture level. To this mixture was added 22.0 g of isophorone diisocyanate followed by addition of 0.1 g of a 10 wt % solution of dibutyltin dilaurate, the temperature being maintained at 65-75° C. for 3 hours. The wt % NCO was determined to be 0.7 wt %. At this point, 13.3 g of N-ethylaminoisobutyltrimethoxysilane was added and agitation continued while cooling to room temperature. A sample was coated and cured as in Example 1 and time to adhesive failure on a smooth surface Delrin® plaque was found to be 250 minutes and on glass slides 400 minutes.

EXAMPLES 7-18

These examples illustrate silylated polymers prepared from hydroxyl-terminated polybutadienes of different number average molecular weights, blends of hydroxyl-terminated polybutadienes, various NCO/OH ratios for preparing the polyurethane prepolymers and pressure sensitive adhesive compositions containing the silylated polymers and optional tackifier.

To a reaction vessel equipped with mixing capability, condenser, nitrogen atmosphere and heating was added 100.0 g of hydroxyl-terminated polybutadiene resin possessing a hydroxyl number as noted in Table 1, 100.0 g of toluene. The reaction mixture was dried by refluxing for 1 hour under a nitrogen atmosphere followed by cooling to below 50° C. then 0.05 g of a 10 wt % solution of dibutyltin dilaurate was added and agitated for 30 minutes. Next, isophorone diisocyanate (IPDI) was added to achieve the NCO/OH ratio as noted in Table 1 below with continued agitation. The reactants were heated at 60-70° C. for 1 hour. A sample was taken for wt % NCO which was determined by standard methodology, the results being set forth in Table 1. To the reaction mixture was added N-ethylaminoisobutyltrimethoxysilane, the amount as noted in Table 1, and agitation continued at temperature for 30-60 minutes with cooling to room temperature. Solids were adjusted to 50.0 wt %. A sample of an approximately 15 g sample of the reaction product was dissolved in 3.8 g toluene having 0.15 g benzoyl peroxide dissolved therein. All samples were bar-coated onto a 2 mil polyester film to yield an approximate 1 mil dry adhesive thickness, air-dried 10 minutes then cured for 5 minutes at 150° C. Lap shear samples were prepared with 0.25 inch×1.0 inch overlap onto 1 minute preheated at 135° C. to a smooth surface Delrin® plaque and a glass slide with a 100 g weight attached to the opposite end. The lap shear samples were suspended in xylene that was slowly stirred using a magnetic stirrer and bar. Times to adhesive failure are set forth in Table 1 below.

TABLE 1

| Example | OH-Terminated Polybutadiene | g IPDI | NCO/OH Ratio | wt % NCO at Capping | Lap Shear Time, hrs Smooth Delrin | Lap Shear Time, hrs Glass |
| --- | --- | --- | --- | --- | --- | --- |
| 7 | Poly bd R20LM | 29.6 | 1.85 | 2.33 | >24 | 4.5 |
| 8 | Poly bd R20LM | 21.6 | 1.35 | 1.05 | >71 | 0 |
| 9 | Krasol LBH-P 2000 | 18.0 | 1.85 | 1.47 | 2 | 2.3 |
| 10 | Krasol LBH-P 2000 | 13.1 | 1.35 | 0.59 | 3.25 | 4 |
| 11 | Krasol LBH-P 2000/5000 @ 48/52 ratio | 13.0 | 1.85 | 1.04 | >24 | >7.5 |
| 12 | Krasol LBH-P 2000/5000 blend @ 48/52 ratio | 9.5 | 1.35 | 0.45 | >5.5 | 5.1 |
| 13 | Krasol LBH-P 3000 | 9.5 | 1.35 | 0.29 | >24 | 0.3 |
| 14 | Krasol LBH-P 5000 | 8.5 | 1.85 | 0.63 | >8 | >8 |
| 15 | Krasol LBH-P 5000 | 6.2 | 1.35 | 0.42 | >24 | 3.6 |
| 16 | Krasol LBH-P 5000 | 5.0 | 1.10 | 0.04 | >5 | >5 |
| 17 | Example 16 with 2.5 g Eastotac 100 W tackifier resin (Eastman) | | | | 4.5 | 4.5 |
| 18 | Example 16 with 2.5 g Sylvarez TR1085 styrenated terpene tackifier resin (Arizona Chemical) | | | | >8 | >8 |

EXAMPLES 19-24

These examples illustrate silylated polymers made with hydroxyl-terminated saturated polybutadienes and with various NCO/OH ratios. The procedure of Examples 7-18 were substantially repeated for these examples. The results are set forth in Table 2 below.

TABLE 2

| Example | OH Terminated Polybutadiene | g IPDI | NCO/OH Ratio | wt % NCO at Capping | Lap Shear Time, hrs Smooth Delrin | Lap Shear Time, hrs Glass |
| --- | --- | --- | --- | --- | --- | --- |
| 19 | Krasol HLBH-P 3000 | 24.5 | 3.70 | 2.52 | 7 | >9 |
| 20 | Krasol HLBH-P 3000 | 8.9 | 1.35 | 0.50 | 1.5 | 0.3 |
| 21 | Poly bd EPOL | 16.0 | 1.85 | 1.22 | 1.25 | 1 |

TABLE 2-continued

| Example | OH Terminated Polybutadiene | g IPDI | NCO/OH Ratio | wt % NCO at Capping | Lap Shear Time, hrs | |
|---|---|---|---|---|---|---|
| | | | | | Smooth Delrin | Glass |
| 22 | Poly bd EPOL | 11.6 | 1.35 | 0.55 | >8.5 | >8.5 |
| 23 | Poly(ethylene-co-1,2-butylene)diol | 16.6 | 1.85 | 0.90 | >24 | >7 |
| 24 | Poly(ethylene-co-1,2-butylene)diol | 12.1 | 1.35 | 0.55 | 8.25 | 6.75 |

EXAMPLE 25

To a reaction vessel equipped with mixing capability, condenser, nitrogen atmosphere and heating was added 50.0 g of hydroxyl-terminated polybutadiene resin Krasol LBH-P 5000 possessing a hydroxyl number of 21.7, 50.0 g of hydroxyl-terminated polybutadiene resin Krasol HLBH-P 3000 possessing a hydroxyl number of 31.4, 25.0 g of toluene, and 75.0 g of ethyl acetate. The contents were dried by refluxing for 1 hour under a nitrogen atmosphere followed by cooling to below 40° C. then 0.03 g of a 10 wt % solution of dibutyltin dilaurate was added and agitated for 15 minutes. Next 6.2 g of isophorone diisocyanate was added for a NCO/OH ratio of 1.10 with continued agitation. The reactants were heated at 70-75° C. until the wt % NCO was determined to be 0.11 wt %. The reaction was cooled to 40° C. then was added 0.4 g of N-ethylaminoisobutyltrimethoxysilane and 0.4 g of N-ethylbutylamine diluted in 3.0 g ethylacetate with agitation. Solids were 51.7 wt %. A sample of an approximately 15 g sample of the reaction product was dissolved in 3.8 g toluene having 0.04 g benzoyl peroxide dissolved, was coated. A second sample without benzoyl peroxide was also coated. All samples were bar-coated onto a 2 mil polyester film to yield an approximately 1 mil dry adhesive thickness, air-dried 10 minutes then cured for 5 minutes at 150° C. Lap shear samples were prepared with 0.25 inch×1.0 inch overlap onto a textured surface Delrin cassette and a glass slide with a 10 g weight attached to the opposite end. Time to adhesive failure for the benzoyl peroxide cured adhesive coating was 40 minutes for the cassette and 2 hours for the glass slide. The sample without benzoyl peroxide resulted in adhesive failure in 2 hours for the cassette and 2.5 hours for the glass slide.

EXAMPLES 26-32

To a reaction vessel equipped with mixing capability, condenser, nitrogen atmosphere and heating was added 100.0 g of hydroxyl-terminated polybutadiene resin noted in Table 3 along with the hydroxyl number, and 100.0 g of toluene. The contents were dried by refluxing for 1 hour under a nitrogen atmosphere followed by cooling to below 40° C. then the grams of isophorone diisocyanate to achieve a NCO/OH ratio of 0.67 was added with continued agitation. After 60 minutes agitation 0.05 g of a 10 wt % solution of dibutyltin dilaurate was added and agitated for 15 minutes. The reactants were heated at 65-70° C. until the wt % NCO was determined to be 0.0 wt %. The grams noted in table 3 of gamma-isocyanato-propyltrimethoxysilane (Silquest A-Link 35) was added and reacted until 0.0 wt % NCO was determined. The reaction was cooled to 40° C. An approximately 15 g sample of the reaction product was dissolved in 3.8 g toluene having 0.04 g benzoyl peroxide dissolved therein was used for coating. All samples were bar-coated onto a 2 mil polyester film to yield an approximate 1 mil dry adhesive thickness, air-dried 10 minutes then cured for 5 minutes at 150° C. Lap shear samples were prepared with 0.25 inch×1.0 inch overlap onto a smooth surface Delrin® plaque and a glass slide with a 10 g weight attached to the opposite end. Times to adhesive failure are set forth in Table 3 below.

TABLE 3

| Example Number | OH Terminated Polybutadiene | OH Number mg KOH | g IPDI | g Silquest A-Link 35 | Lap Shear Time, hrs | |
|---|---|---|---|---|---|---|
| | | | | | Smooth Delrin | Glass |
| 26 | Krasol LBH-P 2000 | 46 | 6.5 | 6.1 | >24 | 0 |
| 27 | Krasol LBH-P 3000 | 33.4 | 4.7 | 4.50 | >24 | >9 |
| 28 | Krasol LBH-P 5000 | 21.7 | 3.1 | 2.3 | >24 | >9 |
| 29 | Poly bd LF3 | 49.4 | 6.7 | 6.3 | >72 | 6.8 |
| 30 | Poly bd R45HTLO | 45.4 | 4.9 | 4.60 | >24 | >5.5 |
| 31 | Poly bd R20LM | 101 | 10.9 | 10.2 | 2.25 | 2.5 |
| 32 | Poly bd EPOL | 51.6 | 5.8 | 5.4 | 0.55 | 0.78 |

EXAMPLES 33-38

The preparative procedures of Examples 26-32 were substantially repeated except that blends of polyols and an NCO/OH of 0.9 to achieve higher molecular weight polyurethane prepolymers were employed. The results are set forth in Table 4 below.

TABLE 4

| Example Number | OH Terminated Polybutadiene | Ratios of Polyols | g IPDI | g Silquest A-Link 35 | wt % Benzoyl Peroxide | Textured Delrin Cassette, hrs | Peel Adhesion, Stainless Steel 12"/min., 180° |
|---|---|---|---|---|---|---|---|
| 33 | Krasol LBH-P 2000/5000 | 1/1.08 | 6.3 | 1.3 | 0 | 3.5 | 1173 g/in |
|  |  |  |  |  | 0.25 | 2.17 |  |
|  |  |  |  |  | 0.5 | 2.5 | 1561 g/in |
| 34 | Krasol LBH-P 2000/5000/R45 HTLO | 1/1.08/2.08 | 6.4 | 1.4 | 0 | 0.25 |  |
|  |  |  |  |  | 0.25 | 2.5 | 194 g/in |
| 35 | Krasol LBH-P 5000 |  | 4.1 | 0.9 | 0 | 3.25 |  |
| 36 | Krasol HLBH-P 3000 |  | 6.0 | 1.3 | 0 | 3.5 | 903 g/in |
|  |  |  |  |  | 0.5 | 3.5 | 784 g/in |
|  |  |  |  |  | 1 | 1.8 |  |
| 37 | Krasol LBH-P 2000/5000/R45 HTLO | 2/1/0.76 | 6.4 | 0.4 | 0 | 2.5 |  |
|  |  |  |  |  | 0.5 | 2.75 | 1295 g/in |
| 38 | Krasol LBH-P 2000/5000/R45 HTLO | 1/2/0.76 | 6.4 | 0.5 | 0.5 | 3.5 | 2270 g/in |

EXAMPLE 39

This example illustrates hydrosilylation crosslinking of silylated polyurethane polymer.

To a reaction vessel equipped with mixing capability, condenser, nitrogen atmosphere and heating was added 96.0 g of hydroxyl-terminated polybutadiene resin Krasol LBH-P 2000, 104.0 g of hydroxyl-terminated polybutadiene resin Krasol LBH-P 5000 and 100.0 g of ethylacetate. The contents were dried by refluxing for 1 hour under a nitrogen atmosphere followed by cooling to below 40° C. then 0.05 g of a 10 wt % solution of dibutyltin dilaurate was added with continued agitation. After 15 minutes 12.7 g of isophorone diisocyanate was added. The reactants were heated at 70-75° C. until the wt % NCO was determined to be 0.0 wt %. Next, 2.7 g of α-isocyanatopropyltrimethoxysilane was added and reacted until 0.0 wt % NCO was measured. The reaction mixture was cooled to 40° C. A sample of approximately 15 g of the reaction product dissolved in 3.8 g toluene, 0.03 g $M'_{0.9}M_{0.1}D_{20.8}D^H_{7.2}T_{0.1}M_{0.1}$ silicone resin wherein M' is a dimethylstyrylsiloxy group, 25 ppm rhodium provided as an ethanol solution of tris(dibutylsulfide)rhodium(III)trichloride containing 1.4 wt % rhodium, was used for coating. The coated sample was bar-coated onto a 2 mil polyester film to yield an approximate 1 mil dry adhesive thickness, air-dried 10 minutes then cured for 5 minutes at 150° C. Lap shear samples were prepared with 0.25 inch×1.0 inch overlap onto a textured surface Delrin® cassette with a 10 g weight attached to the opposite end. Time to adhesive failure was 3.5 hours.

EXAMPLE 40

This example illustrates the silylation of an hydroxyl terminated polyurethane prepolymer with an isocyanato silane capping agent.

To a resin reaction vessel equipped with mixing capability, condenser, nitrogen atmosphere and heating was added 72.5 g of hydroxyl terminated polybutadiene Krasol LBH-P 2000 resin containing a hydroxyl number of 46, 145.0 g of hydroxyl terminated polybutadiene Krasol LBH-P 5000 resin containing a hydroxyl number of 21.7, 32.5 g of hydroxyl terminated polybutadiene Poly$^C$bd R20LM resin containing a hydroxyl number of 101 and 400.3 g of ethyl acetate. Refluxed for 2 hours to dry the mixture followed by cooling to 75-80° C. To this was added 0.27 g of a 10 wt % toluene solution of dimethylbis[(1-oxoneodecyl)oxy]stannane with agitation for 15 minutes. Next 18.6 g of isophorone diisocyanate was added for an NCO/OH equivalent ratio of 0.95. The reactants were heated at 75-80° C. until the wt % NCO was determined per standard methodology and found to be 0.0 wt % followed by drop wise addition of 1.34 g isocyanatopropyltrimethoxysilane. Heating was continued until wt % NCO was 0.0 wt % then the composition was cooled to room temperature. A 25 g sample was dissolved in 12 g ethyl acetate, 0.2 g of a 1 wt % 1.0 g of a 1 wt % toluene solution of dimethylbis[(1-oxoneodecyl)oxy]stannane was bar coated onto 2 mil polyester film to yield an approximate 0.4 mil dry adhesive thickness. The adhesive was air dried 10 minutes, followed by 10 minutes at 80° C. Lap shear samples were prepared with 1.0 inch×1.0 inch overlap onto a glass slide with a 10 g weight attached to the opposite end. Time to failure was >7 hours and adhesive dissolved. Shear adhesion failure temperature (SAFT) for 1.0 inch×1.0 inch overlap and 1 Kg weight was determined to be 275° C.

COMPARATIVE EXAMPLE 41

This comparative example is similar to Example 40 except that the polyurethane prepolymer was not silylated.

To a resin reaction vessel equipped with mixing capability, condenser, nitrogen atmosphere and heating was added 72.5 g of hydroxyl terminated polybutadiene Krasol$^C$ LBH-P 2000 resin containing a hydroxyl number of 46, 145.0 g of hydroxyl terminated polybutadiene Krasol$^C$ LBH-P 5000 resin containing a hydroxyl number of 21.7, 32.5 g of hydroxyl terminated polybutadiene Poly$^C$bd R20LM resin containing a hydroxyl number of 101 and 400.3 g of ethyl acetate. Refluxed for 2 hours to dry the mixture followed by cooling to 75-80° C. To this was added 0.27 g of a 10 wt % toluene solution of dimethylbis[(1-oxoneodecyl)oxy]stannane with agitation for 15 minutes. Next 18.6 g of isophorone diisocyanate was added for an NCO/OH equivalent ratio of 0.95. The reactants were heated at 75-80° C. until the wt % NCO was determined per standard methodology and found to be 0.0 wt % followed by cooling to room temperature. A 25 g sample was dissolved in 12 g ethyl acetate, 0.2 g of a 1 wt % 1.0 g of a 1 wt % toluene solution of dimethylbis[(1-oxoneodecyl)oxy]stannane was bar coated onto 2 mil polyester film to yield an approximate 0.4 mil dry adhesive thickness. The adhesive was air dried 10 minutes, followed by 10 minutes at 80° C. Lap shear samples were prepared with 1.0 inch×1.0 inch overlap onto a glass slide with a 10 g weight attached to the opposite end. Time to failure was >7 hours and adhesive dissolved. Shear adhesion failure temperature (SAFT) for 1.0 inch×1.0 inch overlap and 1 Kg weight was determined to be 59° C.

EXAMPLE 42

To a resin reaction vessel equipped with mixing capability, condenser, nitrogen atmosphere and heating was added 58.0 g of hydroxyl terminated polybutadiene Krasol$^C$ LBH-P 2000 resin containing a hydroxyl number of 46, 116.0 g of hydroxyl terminated polybutadiene Krasol$^C$ LBH-P 5000 resin containing a hydroxyl number of 21.7, 26.0 g of hydroxyl terminated polybutadiene Poly$^C$bd R20LM resin containing a hydroxyl number of 101 and 333.2 g of ethyl acetate. Refluxed for 2 hours to dry the mixture followed by cooling to 75-80° C. To this was added 1.77 g of a 1 wt % toluene solution of dimethylbis[(1-oxoneodecyl)oxy]stannane with agitation for 15 minutes. Next 16.6 g of isophorone diisocyanate was added for an NCO/OH equivalent ratio of 1.06. The reactants were heated at 75-80° C. until the wt % NCO was determined per standard methodology and found to be 0.06 wt % followed by cooling to room temperature. A solution of 20 g ethyl acetate and 1.7 g N-ethylaminoisobutyltrimethoxysilane was added drop wise. A 25 g sample of this composition was dissolved in 12 g ethyl acetate, 0.2 g of a 1 wt % 1.0 g of a 1 wt % toluene solution of dimethylbis[(1-oxoneodecyl)oxy]stannane was bar coated onto 2 mil polyester film to yield an approximate 0.4 mil dry adhesive thickness. The adhesive was air dried 10 minutes, followed by 10 minutes at 80° C. Lap shear samples were prepared with 1.0 inch×1.0 inch overlap onto a glass slide with a 10 g weight attached to the opposite end. Time to failure was >7 hours and adhesive dissolved. Shear adhesion failure temperature (SAFT) for 1.0 inch×1.0 inch overlap and 1 Kg weight was determined to be greater than 281° C.

COMPARATIVE EXAMPLE 43

This comparative example is similar to Example 42 except that the polyurethane prepolymer was not silylated.

To a resin reaction vessel equipped with mixing capability, condenser, nitrogen atmosphere and heating was added 58.0 g of hydroxyl terminated polybutadiene Krasol$^C$ LBH-P 2000 resin containing a hydroxyl number of 46, 116.0 g of hydroxyl terminated polybutadiene Krasol$^C$ LBH-P 5000 resin containing a hydroxyl number of 21.7, 26.0 g of hydroxyl terminated polybutadiene Poly$^C$bd R20LM resin containing a hydroxyl number of 101 and 333.2 g of ethyl acetate. Refluxed for 2 hours to dry the mixture followed by cooling to 75-80° C. To this was added 1.77 g of a 1 wt % toluene solution of dimethylbis[(1-oxoneodecyl)oxy]stannane with agitation for 15 minutes. Next 16.6 g of isophorone diisocyanate was added for an NCO/OH equivalent ratio of 1.06. The reactants were heated at 75-80° C. until the wt % NCO was determined per standard methodology and found to be 0.03 wt % followed by cooling to room temperature. Drop wise 0.4 g ethylbutyl amine and 20 g ethyl acetate solution was added to the prepolymer to yield an organic amine terminated polyurethane. A 25 g sample was dissolved in 12 g ethyl acetate, 0.2 g of a 1 wt % 1.0 g of a 1 wt % toluene solution of dimethylbis[(1-oxoneodecyl)oxy]stannane was bar coated onto 2 mil polyester film to yield an approximate 0.4 mil dry adhesive thickness. The adhesive was air dried 10 minutes, followed by 10 minutes at 80° C. Lap shear samples were prepared with 1.0 inch×1.0 inch overlap onto a glass slide with a 10 g weight attached to the opposite end. Time to failure was >7 hours and adhesive dissolved. Shear adhesion failure temperature (SAFT) for 1.0 inch×1.0 inch overlap and 1 Kg weight was determined to be 62° C.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

What is claimed is:

1. A silylated polymer obtained by the process which comprises:
   a) reacting hydroxyl-terminated polybutadiene and, optionally, chain extender and/or other polyol, with polyisocyanate in the presence of a monofunctional fluorine-containing organic compound possessing an isocyanate reactive functionality to provide isocyanate-terminated polyurethane prepolymer; and,
   b) reacting the isocyanate-terminated polyurethane prepolymer with silane possessing hydrolyzable functionality and isocyanate-reactive functionality to provide silylated polyurethane prepolymer wherein less than all of the isocyanate groups of the isocyanate-terminated polyurethane prepolymer are silylated.

2. The silylated polymer of claim 1 wherein the silane is a primary or secondary aminosilane of the general formula:

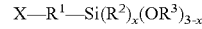

wherein X is —SH or —NHR$^4$ in which R$^4$ is H, a monovalent hydrocarbon group of up to 8 carbon atoms or —R$^5$—Si(R$^6$)$_y$(OR$^7$)$_{3-y}$, R$^1$ and R$^5$ each is the same or different divalent hydrocarbon group of up to 12 carbon atoms, optionally containing one or more heteroatoms, each R$^2$ and R$^6$ is the same or different monovalent hydrocarbon group of up to 8 carbon atoms, each R$^3$ and R$^7$ is the same or different alkyl group of up to 6 carbon atoms and x and y each, independently, is 0, 1 or 2.

3. The silylated polymer of claim 2 wherein the silane is a secondary amino silane.

4. The silylated polymer of claim 2 wherein the silane is a mercaptosilane.

5. The silylated polymer of claim 2 wherein the silane is selected from the group consisting of 2-mercaptoethyl trimethoxysilane, 3-mercaptopropyl trimethoxysilane, 2-mercaptopropyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane, 3-mercaptopropyl trioctoxysilane, 2-mercaptoethyl tri-2'-ethylhexoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxy phenylsilane, 3-mercaptocyclohexyl-trimethoxysilane, 12-mercaptododecyl trimethoxy silane, 12-mercaptododecyl triethoxy silane, 18-mercaptooctadecyl trimethoxysilane, 18-mercaptooctadecyl methoxydimethylsilane, 2-mercapto-2-methylethyl-tripropoxysilane, 2-mercapto-2-methylethyl-trioctoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyl trimethoxysilane, 1-mercaptomethyltolyl triethoxysilane, 2-mercaptoethylphenyl trimethoxysilane, 2-mercaptoethylphenyl triethoxysilane, 2-mercaptoethyltolyl trimethoxysilane, 2-mercaptoethyltolyl triethoxysilane, 3-mercaptopropylphenyl trimethoxysilane, 3-mercaptopropylphenyl triethoxysilane, 3-aminopropyltrimethoxysilane, 3-aminopropyltriethoxysilane, 4-aminobutyltriethoxysilane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethylbutyldimethoxymethylsilane, N-ethyl-4-amino-3,3-dimethylbutyltrimethoxysilane, N-(cyclohexyl)-3-aminopropyltrimethoxysilane, N-(2-aminoethyl)-3-aminopropyltrimethoxysilane, N-(2-aminoethyl)-3-aminopropyltriethoxy-silane, N-(2-aminoethyl)-3-aminopropylmethyldimethoxysilane, aminopropyltriethoxysilane, bis-(3-trimethoxysilyl-2-methylpropyl)amine and N-(3'-trimethoxysilylpropyl)-3-amino-2-methylpropyltrimethoxysilane.

6. The silylated polyurethane of claim 2 wherein not more than about 95 percent of the isocyanate groups of the isocyanate-terminated polyurethane prepolymer are silylated.

7. A silylated polymer obtained by the process which comprises:
a) blending at least one hydroxyl-terminated polybutadiene diol possessing terminal hydroxyl groups bonded to carbon atoms adjacent to double bonded carbon atoms and a number average molecular weight of from 500 to 10,000 grams per mole, at least one hydroxyl-containing polybutadiene polyol possessing an average of from 2.4 to about 2.8 hydroxyl groups per molecule, and optionally, chain extender and/or other polyol,
b) reacting the mixture of step (a) with diisocyanate to provide hydroxyl-terminated polyurethane prepolymer possessing a molar ratio of NCO to OH of from about 0.3 to about 0.95; and,
c) reacting the hydroxyl-terminated polyurethane prepolymer of step (b) with isocyanatosilane possessing hydrolyzable functionality to provide silylated polyurethane possessing a level of silation of not more than 95 percent.

8. The silylated polyurethane of claim 7 wherein in step (c) not more than about 90 percent of the hydroxyl groups of the hydroxyl-terminated polyurethane prepolymer are silylated.

9. The silylated polyurethane of claim 7 wherein the hydroxyl terminated polyurethane in step (b) possesses a molar ratio of NCO to OH of from 0.5 to 0.9 and, step (c) is carried out in the additional presence of monofunctional hydroxyl-capping reactant to cap non-silylated hydroxyl groups in the silylated polyurethane.

10. The silylated polyurethane of claim 9 wherein in step (c) not more than about 90 percent of the hydroxyl groups of the hydroxyl-terminated polyurethane prepolymer are silylated.

11. A curable pressure sensitive adhesive composition comprising a pressure sensitive adhesive amount of at least one partially silylated polyurethane of claim 1.

12. A curable pressure sensitive adhesive composition comprising a pressure sensitive adhesive amount of at least one partially silylated polyurethane of claim 7.

13. The curable pressure sensitive adhesive composition of claim 11 comprising at least one additional component selected from the group consisting of filler, tackifier, silane adhesion promoter, plasticizer, solvent, thixotropic agent, U.V. stabilizer, antioxidant and curing catalyst.

14. A curable pressure sensitive adhesive composition comprising a pressure sensitive adhesive amount of at least one partially silylated polyurethane obtained by the process which comprises:
a) reacting hydroxyl-terminated polybutadiene and, optionally, chain extender and/or other polyol, with polyisocyanate to provide isocyanate-terminated polyurethane prepolymer; and,
b) reacting the isocyanate-terminated polyurethane prepolymer with silane possessing hydrolyzable functionality and isocyanate-reactive functionality to provide silylated polyurethane prepolymer wherein less than all of the isocyanate groups of the isocyanate-terminated polyurethane prepolymer are silylated; and,
c) carrying out step (b) in the additional presence of monofunctional isocyanate-capping reactant to cap non-silylated isocyanate groups in the silylated polyurethane, wherein the curable pressure sensitive adhesive composition further comprises a tackifying amount of MQ tackifier resin and a curing catalyst therefor.

15. The cured pressure sensitive adhesive composition of claim 11.

16. The cured pressure sensitive adhesive composition of claim 14.

17. The curable pressure sensitive adhesive composition of claim 12 comprising at least one additional component selected from the group consisting of filler, tackifier, silane adhesion promoter, plasticizer, solvent, thixotropic agent, U.V. stabilizer, antioxidant and curing catalyst.

18. A curable pressure sensitive adhesive composition comprising a pressure sensitive adhesive amount of at least one partially silylated polyurethane obtained by the process which comprises:
a) blending at least one hydroxyl-terminated polybutadiene diol possessing terminal hydroxyl groups bonded to carbon atoms adjacent to double bonded carbon atoms and a number average molecular weight of from 500 to 10,000 grams per mole, at least one hydroxyl-containing polybutadiene polyol possessing an average of from 2.4 to about 2.8 hydroxyl groups per molecule, and optionally, chain extender and/or other polyol,
b) reacting the mixture of step (a) with diisocyanate to provide hydroxyl-terminated polyurethane prepolymer possessing a molar ratio of NCO to OH of from about 0.3 to about 0.95; and,
c) reacting the hydroxyl-terminated polyurethane prepolymer of step (b) with isocyanatosilane possessing hydrolyzable functionality to provide silylated polyurethane possessing a level of silation of not more than 95 percent, and wherein said curable pressure sensitive adhesive composition further comprises a tackifying amount of MQ tackifier resin and a curing catalyst therefor.

19. The cured pressure sensitive adhesive composition of claim 12.

20. The cured pressure sensitive adhesive composition of claim 18.

21. The cured pressure sensitive adhesive composition of claim 13.

22. The cured pressure sensitive adhesive composition of claim 17.

23. The silylated polymer of claim 1 wherein the monofunctional fluorine-containing organic compound possessing an isocyanate reactive functionality is a fluorinated alcohol.

24. The silylated polymer of claim 23 wherein the fluorinated alcohol has the formula $HOCH_2CH_2(CF_2)_{2-10}CF_3$.

* * * * *